United States Patent
Aguilera et al.

(10) Patent No.: US 6,843,103 B2
(45) Date of Patent: Jan. 18, 2005

(54) AUTOMATIC SYSTEM FOR COLLECTING, WEIGHING AND RELEASING SOLID PARTICLES

(75) Inventors: Manolo Constantino Aguilera, Seville (ES); Francisco Rodriquez Barea, Seville (ES); Miguel Angel Delgado Lozano, Seville (ES); Enrique Tova Holgado, Seville (ES)

(73) Assignee: Ingenieria Energetica de Contaminacion, S.A., Seville (ES)

( * ) Notice: Subject to any disclaimer, the term of this patent is extended or adjusted under 35 U.S.C. 154(b) by 0 days.

(21) Appl. No.: 10/433,915
(22) PCT Filed: May 22, 2001
(86) PCT No.: PCT/ES01/00200
§ 371 (c)(1),
(2), (4) Date: Mar. 31, 2004
(87) PCT Pub. No.: WO02/095364
PCT Pub. Date: Nov. 28, 2002

(65) Prior Publication Data
US 2004/0154378 A1 Aug. 12, 2004

(51) Int. Cl.$^7$ ............................. G01F 3/24; G01F 22/00
(52) U.S. Cl. ................. 73/28.01; 73/863.41; 73/863.51; 73/863.54; 73/863.81; 73/863.83; 73/863.86; 73/864.33
(58) Field of Search ............................ 73/28.01, 28.04, 73/53.01, 53.07, 61.71, 61.72, 863.41–863.43, 863.51–863.54, 863.57, 863.81, 863.83, 863.86, 864.33

(56) References Cited

U.S. PATENT DOCUMENTS

| | | | | | |
|---|---|---|---|---|---|
| 4,442,699 A | * | 4/1984 | Ramelot | ..................... | 73/28.01 |
| 5,109,201 A | * | 4/1992 | Trerice et al. | .............. | 324/642 |
| 5,970,781 A | * | 10/1999 | Hiss et al. | ................. | 73/28.01 |

* cited by examiner

Primary Examiner—Daniel S. Larkin
(74) Attorney, Agent, or Firm—Collen IP; Donald J. Ranft (57) ABSTRACT

A automatic system for the capture, weighing and expulsion of solid particles, consisting of an airtight weighing chamber, inside which there is an inner container in which the particles entering the chamber through an entrance duct are collected. Said container transmits its weight to a weighing sensor, also located inside the weighing chamber but not in contact with the walls of the chamber. Once weighed, the sample is expelled from the chamber by the injection of compressed air. The system can be directly applied to determine the mass flow of solid particles in pneumatic transport ducts by integrating it into automatic sampling systems, and also gives a signal which can be integrated in regulating loops for the control of said flow.

15 Claims, 4 Drawing Sheets

AUTOMATIC SYSTEM FOR COLLECTING, WEIGHING AND RELEASING SOLID PARTICLES

CROSS REFERENCE TO RELATED APPLICATIONS

PCT Application ES01/00200; Filed May 22, 2001.

BACKGROUND OF THE INVENTION

1. Field of Invention

There are numerous industrial processes which require the transport of solids through ducts using a carrier gas steam. Examples are the food industry, the pharmaceutical industry and, especially, combustion processes using solid fuel, such as power plants, cement factories and blast furnaces.

Although for gases and liquids there has traditionally been a wide variety of equipment for continuous measurement of the mass flow through ducts, in the case of pneumatically transported solids, it is only in recent years that promising technologies have been developed for determining this parameter.

The importance of measuring the mass flow of solids depends on the particular process involved. For coal-fired power stations this measurement is of vital importance from the point of view of the performance and operation of the plant and the emission of pollutants.

Most coal-fired power stations use direct fuel feed systems. In these systems, the coal or other solid fuel is pulverised in several mills, where a stream of hot air dries the coal and carries it through several ducts to the burners located in the boiler furnace. The number of burners fed by each mill varies from one installation to another, but there are generally 4–6 of them. The transport ducts from the mills to the burners are, in general, of different lengths and layouts, and with different types and numbers of bends and changes of direction. This difference in hydraulic resistance between different ducts, and possible asymmetries in the flow inside the mills or the classifiers causes significant imbalances in the supply of coal and air to each burner.

These imbalances have a negative influence on performance and on the generation of pollutants in this type of installation, in such a way that the existence of critical areas with an inappropriate air/coal ratio causes penalties with respect to these extremely important parameters. These imbalances can also generate areas of high reduction which cause a drop in the fusion point of the ash, and, consequently, increase the propensity of ash deposition on the boiler pipes (slagging). This causes significant losses due to heat transfer, and at times causes problems which make it necessary to shut down the plant, with the consequent loss of production.

A common practice in coal-fired power stations to reduce these imbalances is to add orifices of different diameters into the ducts to the burners, causing different pressure drops in order to equalise the hydraulic resistance of the different ducts.

The flow is balanced in each duct by means of measurements taken during tests using clean air, with no coal. Due to the peculiarities of the flow of biphasic mixtures, this balancing with clean air does not guarantee a balanced distribution of coal during normal operation of the mill. In addition, the imbalances in the flow of coal between the different ducts of a mill varies, in magnitude and direction, with mill operation, and so the above adjustment has a limited efficiency.

The environmental limitations of recent years have encouraged the use of low $NO_x$ burners which minimise the generation of this pollutant by adjusting the stoichiometry of the flame. The optimum operation of this type of burner is conditioned by a tight control of the air/coal ratio.

All of the foregoing underlines the need for providing these installations with control loops to regulate the supply of coal to the boiler. These control loops should be based on adjustable mechanisms, such as dampers, directional vanes, etc., as well as on reliable measurements of the flow of coal to each of the burners.

2. Description of Related Prior Art

At present there exists a wide range of equipment for measuring the flow of pneumatically transported solids. This equipment falls into two large groups: extractive and non-extractive equipment, depending on whether samples are taken from the ducts.

Extractive equipment aspirates a sample of the solids carried in each duct. This sample, after being weighed and analysed in the laboratory, makes it possible to obtain the mass flow and the particle size distribution.

This equipment is based mainly on international standards developed for the sampling of pulverised coal. These standards, ASTM D197-87, ISO 9931 and the ESI Industry Standard, specify a method and the basic components of pulverised coal sampling equipment in circular ducts, with the ultimate aim of determining the flow of coal and the particle size distribution.

The ASTM D197-87 standard establishes the use of manual equipment, using a probe equipped with a single nozzle which is taken to different locations on two diameters at 90° to each other in a transversal section of the duct. The sample must be aspirated at the same velocity as the carrier air stream (isokinetic velocity). This aspiration velocity must be adjusted in order to obtain a true reading, since a lower velocity would give a sample with a lack of fines and a higher velocity would overestimate these.

The most commonly used method for sampling pneumatically transported solid particles is that specified by the ISO 9931 standard. This standard has been used as a reference by several manufacturers of equipment, such as M&W Asketeknik, GEE-EER, INERCO and Mission Instruments. These are all manual, with a rotating probe and four aspiration nozzles, each one of which sweeps the same area of the transversal section of the duct as it turns. The sample is extracted isokinetically by means of adjusting the suction provided by an ejector and is separated from the air flow by a cyclone.

This last method presents, in comparison to the previous one, a significant improvement as regards the representativity of the sample, and is less sensitive to the effects of particle segregation produced by disturbances in the flow.

Equipment based on the ESI Industry Standard uses null pressure probes which are manually positioned at different places on the transversal section of the duct, aspirating at each point at isokinetic velocity. Examples of commercial equipment using this method are the SMG-10 and AKOMA systems. The advantage of this method, in comparison to the others, is that it aspirates isokinetically at all points of the section, and its main disadvantage is the length of time needed for the sampling.

Other equipment, based on the methods described above, has also been developed to automate sampling. One example of this type of equipment is the APFS developed by M&W Asketeknik (patent W09810266). This equipment is based on the ISO 9931 standard, with regard to the shape of the probe and aspiration nozzles, as well as the component parts and the operating principle. The innovation it includes is the installation in each duct of probes which can be inserted and retracted from the duct automatically using a rack and pinion type mechanism actuated by an electric motor.

As an advanced version of the above equipment, M&W Asketeknik has developed the ACFM-2100, which, using the same probe and the same actuating mechanism, incorporates in a control unit a cyclone for separating particles, connected to a continuous system for inferring the amount of sample extracted during each sampling. This system consists of a cylindrical chamber which during sampling is filled to a certain level. An optical sensor detects the level of particles in the chamber and therefore the volume of the sample extracted. The flow of solids in the duct is inferred from the apparent density of the particles.

The disadvantage of this system is that it produces results by indirect measurement of the weight of the particles by determining the volume of the sample. This may give rise to significant errors in the case of changes in the density of the solid or distribution of the size of particles, requiring continuous adjustment of the equipment to guarantee the quality of the measurement.

The other group of equipment for the measurement of the mass flow of particles is made up of non-extractive systems, which have developed greatly in recent years. These systems are based on the measurement of some physical property in the biphasic flow related to the concentration of the particles. In addition to methods based on electrostatic, acoustic and mechanical methods, all the regions of the electromagnetic spectrum, from gamma rays to microwaves, have been used for the development of these sensors.

These measurement systems have the disadvantage of not being very precise and accurate, due to the fact that they are sensitive to parameters such as the humidity content of the mixture, the size of particles and the phenomena of segregation in the ducts. In addition, they require periodic calibration using comparative measurements carried out using extractive methods, and do not allow for the obtention of a sample for later laboratory analysis.

Of all the documents analysed, those which most resemble the device in question are systems for weighing bulk materials, either for continuous flow measurement or for packaging or bagging. Examples are U.S. Pat. No. 4,513,830 (Teccon) and U.S. Pat. No. 5,121,638 (Buehler). However, these devices, in addition to having other aims, lack, among others, the characteristics related to the particle expulsion system.

Within the specific field of particle transport in a gas stream, there is U.S. Pat. No. 4,758,118 (Rachner & Schott), although the aim of the procedure and the device described is not so much the measurement of the flow of an already established stream, but the previous stage of introduction of a measured amount of particle material in a gas stream to make up a particular mass flow. For this purpose, the weight of the pulverised material is measured using a container for weighing which uses electrical load cells on which that container rests (column 5, lines 8 to 17). The description of the weighing container, however, is not given in more detail, and so it can be considered that it does not affect the novelty of the device as described in claims 1 to 7.

U.S. Pat. No. 4,490,077 (Nippon Kohan KK/Sankyo Dengyo KK), in the same sector, presents a similar case, where load cells are also used for continuous measurement of particles in a container. Here, again, the brief description of the weighing device allows us to conclude that it is not relevant for the application analysed. Other patents have been recovered with similar aims (dosed feed of particles to gas streams by weighing), but none of these concentrates on the weighing device. In some of these, indeed, such as U.S. Pat. No. 4,669,921 (Charbonnages de France), it is specified that the gravimetric measuring device used is one available on the market (column 3, lines 11 to 17).

Another document related to this subject is U.S. Pat. No. 4,838,738 (Shell Oil Co.), where the mass flow of a mixture of solid particles and gas supplied to a reactor is controlled by determining the weight of the mixture in a container. In this patent also, although a weighing device is used, the general layout is different.

All of this means that at present none of these technologies has reached a sufficiently robust state for large-scale industrial implementation.

BRIEF SUMMARY OF THE INVENTION

This invention is an automatic system for the capture, weighing and expulsion of solid particles which reach the system after being separated from a gas stream by means of a cyclone, or by gravity, through devices such as hoppers, funnels, storage chambers, etc. This system can be applied directly to the continuous measurement of the flow of particles suspended in a stream of carrier gas.

With regard to direct applications, the system can be used jointly with any isokinetic solid particle sampling system in pneumatic carrier ducts. These sampling systems may be based on any of the existing standards for the sampling of these particles, ASTM D197-87, ISO 9931 or ESI Industry Standard, and can be applied to any system which supposes automation of the equipment and procedures described in these standards.

One example of this application; would be in coal-fired power stations, in which the coal is pulverised in mills and then transported pneumatically through several ducts to the burners located in the boiler furnace.

There are several international standards for obtaining representative samples from these ducts, which make it possible to obtain, based on the weight of the sample, the flow of coal fed to the boiler through each one, and the size distribution of the particles or other parameters which may be of interest for the operation and state of the mills.

The system to be patented may be integrated in automatic particle sampling equipment based on any of these international standards, making up a system which makes it possible to carry out continuously measurement of the mass flow of solids transported pneumatically through a transport duct.

The measurements obtained may also be integrated in flow regulation systems, either in the ducts themselves or in the mills, constituting control loops which make it possible to balance the supply of solids through different ducts and provide a uniform feed to downstream equipment. In the case of coal-fired power stations, the imbalances in the supply of fuel to the boiler have a negative effect on the performance of the unit, as well as on the generation of nitrogen oxides and localised slagging.

The system makes it possible to obtain automatically a precise weighing of the sample extracted, which makes it possible to determine the mass flow of said particles in the transport stream, depending on: the number and the area of sampling nozzles, the velocity of aspiration of the sample, the area of the transport duct and the time taken for sampling.

As well as providing the flow measurement, with this system it is possible to evacuate the sample for a new weighing, returning it to the duct from which it was taken or transporting it to a container for further laboratory analysis.

Therefore, the system constitutes a continuous measurement system of mass flow of solid particles in pneumatic carrier ducts.

The system consists basically of a chamber with an orifice in the top part through which the particles fall. Inside this chamber there is a container for collecting the solid particles which enter the chamber. The container rests freely on a weighing sensor without contacting the walls of the chamber, since any contact could transmit part of the weight of the particles to the walls with the resulting error in measurement.

The weighing chamber has one or more ducts for the entry of compressed air. The compressed air enables the system to evacuate the sample through several exit ducts, and so, without subjecting the sensor to overpressure which may damage it, the total extraction of the particles from the container is guaranteed and at the same time the weighing chamber is cleaned, avoiding the accumulation of particles in the interior of the chamber which could affect future measurements.

The system described gives a direct measurement of the mass of the particles collected, which is an advantage with respect to those at present existing and installed in automatic isokinetic sampling equipment, that are based on measurements of the volume of the sample collected using optical sensors. This measurement is related directly to the mass flow of particles in the duct, independently of the nature of those particles, their size distribution and their apparent density. Therefore there is no need for additional adjustments to infer the flow of particles when their characteristics change.

With respect to continuous measuring systems of the non-extractive type mentioned in the previous section, the system described has the following advantages:

It allows a sample of particles to be obtained. This sample may be taken to the laboratory for the determination of important parameters such as humidity and the particle size distribution, or physical and chemical characteristics.

It provides more accurate results since it is based on direct measurement of the mass collected according to a reference method.

It needs no calibration using comparative measurements. Non-extractive measuring equipment carries out indirect measuring which is related to the particle flow through laborious calibrations using manual reference systems. In this aspect, the system described, associated with automatic portable sampling equipment, makes it possible the automatic execution of calibration routines for these measuring systems.

The system requires only the calibration of the weighing sensor, which may be carried out during periodic maintenance activities, using standard reference masses.

This invention can be applied to any system of pneumatic transport of solids. In the particular case of pulverised coal power stations, it can be used for the detection of imbalances in coal feeds among the different burners of the boiler. It also provides a signal which can be integrated in the automatic control loops of the mills to provide optimum adjustment of the operating conditions of the unit, as well as in the specific solid flow control loops based on regulating systems such as dampers, flow deflectors or directional vanes installed within the ducts or inside the mills or classifiers.

BRIEF DESCRIPTION OF THE DRAWINGS

For a better understanding of the present invention, drawings are attached showing, as examples only, some variations on the system layout.

The sample aspirated circulates through a cyclone (28) where the particles are separated from the gas stream, falling by gravity into the weighing chamber (1). Once the sample has been weighed it is evacuated into a container for laboratory analysis or returned to the duct (18).

FIG. 3 shows a detail of the extraction system of a possible automatic solid particle sampling system. The figure shows a cylindrical tube (20) with four 5 mm holes through which the sample is extracted. This tube (20) is a variant of the nozzles specified in the ISO 9931 standard, and has the advantage that it is less likely to be jammed by solids. The tube rotation mechanism (21), which uses an angular gear, is also shown, as well as the cylindrical chamber (25) into which the probe is retracted when sampling is not necessary.

FIGURE LEGEND

1. Weighing Chamber
2. Weighing Chamber Outer Container
3. Weighing Chamber Lid
4. Weighing Chamber Sample Inlet Duct
5. Weighing Chamber Inner Container
6. Platform
7. Weighing Sensor (or Load Cell)
8. Cylindrical Concentric Lip
9. Weighing Chamber Inlet Ball Valve
10. Pneumatic Actuator
11. Transmitter
12. Seal
13. Stops 14. Compressed Air Inlet Duct
15. Weighing Chamber Outlet Duct
16. Weighing Chamber Outlet Ball Valve
17. Weighing Chamber Outlet Valve Actuator
18. Process Duct/Pipe
19. Rotating Probe
20. Sample Extraction Tube
21. Tube Rotation Mechanism
22. Electric Motor
23. Pneumatic Cylinder
24. Bracket
25. Cylindrical chamber
26. Bypass
27. Control Unit
28. Cyclone
29. Air Flow Regulator
30. Weighing Chamber Sample Expulsion Valve
31. Cyclone
32. Weighing Chamber Sample Expulsion Valve
33. Weighing Chamber
34. Cyclone
35. Cyclone
36. Weighing Chamber
37. Weighing Chamber
38. Lab Sample Container
39. Pneumatic Line For Probe Cleaning
40. Probe Sample Valve
41. Pressure Relief Valve

DESCRIPTION OF A PREFERRED EMBODIMENT

Figure 1:
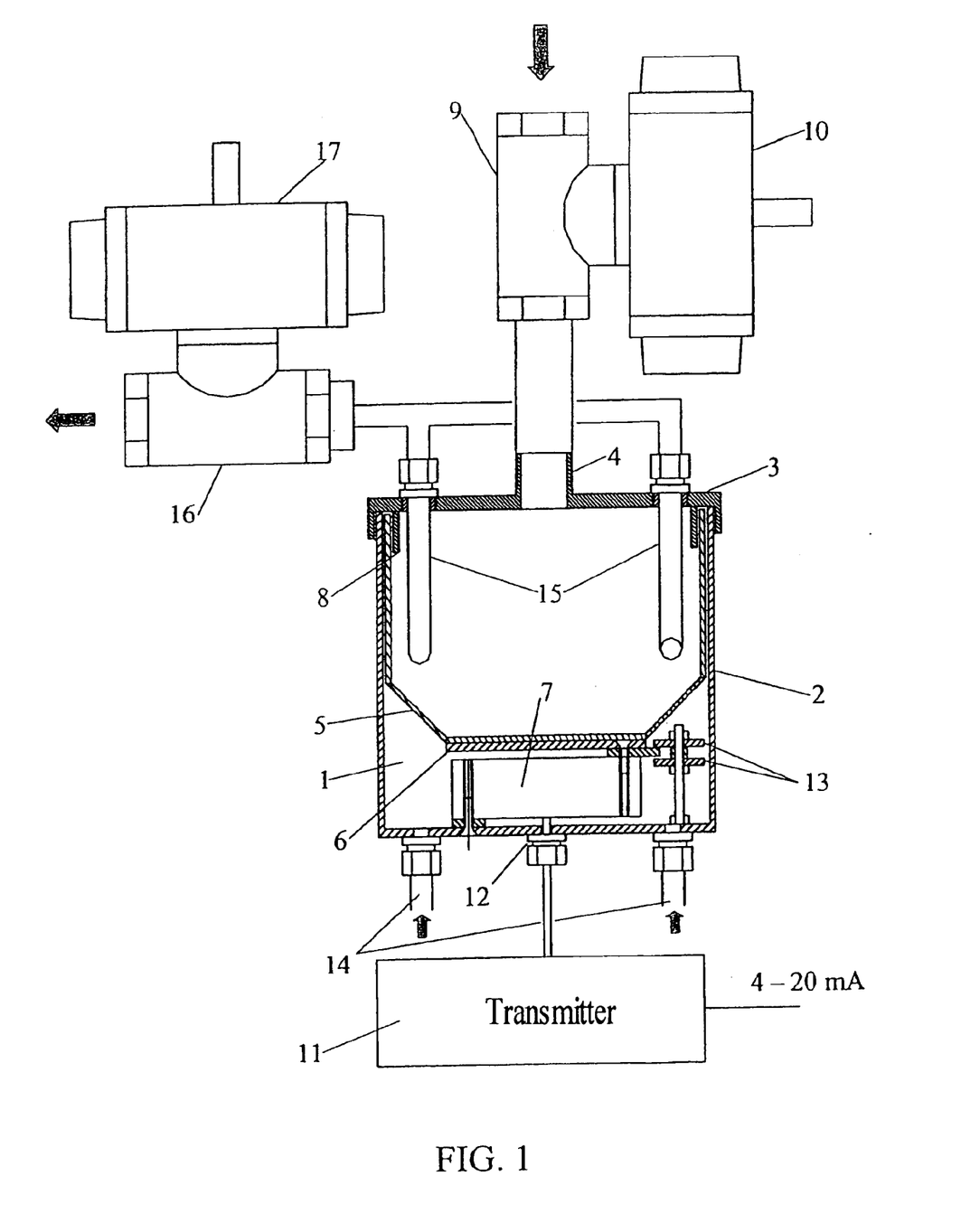
FIG. 1 presents a diagram of the automatic capture, weighing and expulsion system, showing the weighing chamber (1), inside which there is an inner container (5) that, without contacting the walls of the outer container (2) collects the solid particles which enter through the weighing chamber sample inlet duct (4). This inner container (5) rests on a platform (6) which is supported on a weighing sensor (7) connected to a transmitter (11) which generates a signal (for example 4–20 Ma) depending on the weight resting on the sensor. The figure shows the compressed air inlet ducts (14) and the outlet ducts (15) through which the sample is evacuated once it has been weighed.

The solid particle capture, weighing, and expulsion system consists of a weighing chamber (1) made up of a cylindrical outer container (2) and a screw lid (3). The lid (3) has a particle entrance duct (4); the particles enter the chamber (1) by gravity and are collected in a container (5) which is also cylindrical with an exterior diameter two millimetres less than the internal walls of the container (2). The container (5) has a conical base to facilitate the elimination of the particles, and is joined to a platform (6) attached by screws to a load cell (7) on the base of the container (2) and supported above it by two screws. In this way the weight of the sample is transmitted to the load cell (7) as the sample is collected.

The arrangement of the container (5) inside the chamber (1) composed of parts (2) and (3) is concentric to these, and so between the container (2) and the container (5) there is a one millimeter space in the form of a circular corona. The height of the container (5) is such that on screwing the lid (3) tightly onto the container (2) there is a one millimeter space between the inside of the lid and the top of the container (5), in order to facilitate the entry of air for the expulsion of the particles.

The lid (3) also has a cylindrical concentric lip (8) of a diameter such that between its outside face and the inside surface of the container (5) there is a space of approximately one millimeter in the form of a circular corona.

The particle inlet duct (4) is connected to a ball valve (9) activated by a pneumatic actuator (10) driven by a 3-way electrovalve. This ball valve (9) opens during the entry of particles and, on closing, seals the weighing chamber (1).

The load cell (7) is connected to a transmitter (11) which generates a signal of between 4–20 mA proportional to the mass deposited on the cell (7). This transmitter (11) is outside the weighing system, and so the connection cable passes through the container (2) through a seal (12) which ensures that the weighing chamber (1) remains airtight.

The load cell (7) is protected against excess pressure by two physical stops (13) located on a threaded rod on the base of the container (2) which limit the maximum flexing of the load cell (7).

The base of the container (2) has two ducts for the entry of compressed air (14) to expel the sample once it has been weighed. The lid (3) also has two ducts for the expulsion of the sample (15) by the compressed air. These ducts (15) enter the weighing chamber (1) as far as the conical part of the container (5), and are connected to a second ball valve (16) which is pneumatically activated and is closed during the sample collection cycle, to avoid the entry of air into the weighing chamber (1).

The operating sequence of the solid particle capture, weighing and expulsion system described above is as follows:

During the collection of the sample, the ball valve (9) remains open so that the particles are collected in the container (5). The maze formed by parts (2), (3) and (5) means that it is unlikely for particles to reach the load cell (7) during the collection of the sample.

Once the particles have been captured, the ball valve (9) closes, and the transmitter (11) connected to the load cell (7) takes a reading.

Then the sample is expelled by means of compressed air injected through the ducts (14) located in the base of the container (2), after the valve (16) is opened. This air reaches the container (5) through the maze made up of parts (2), (3) and (5), and raises the mass of particles and generates a vortex which facilitates its expulsion through the ducts (15).

The expulsion air should be previously filtered to eliminate oils and drops of condensed water. In addition to serving as the medium for expulsion of the particles, this air also cleans any particles which may be left on the walls of the container (5) and dries any humidity from the particles possibly condensed on the walls.

Figure 2:
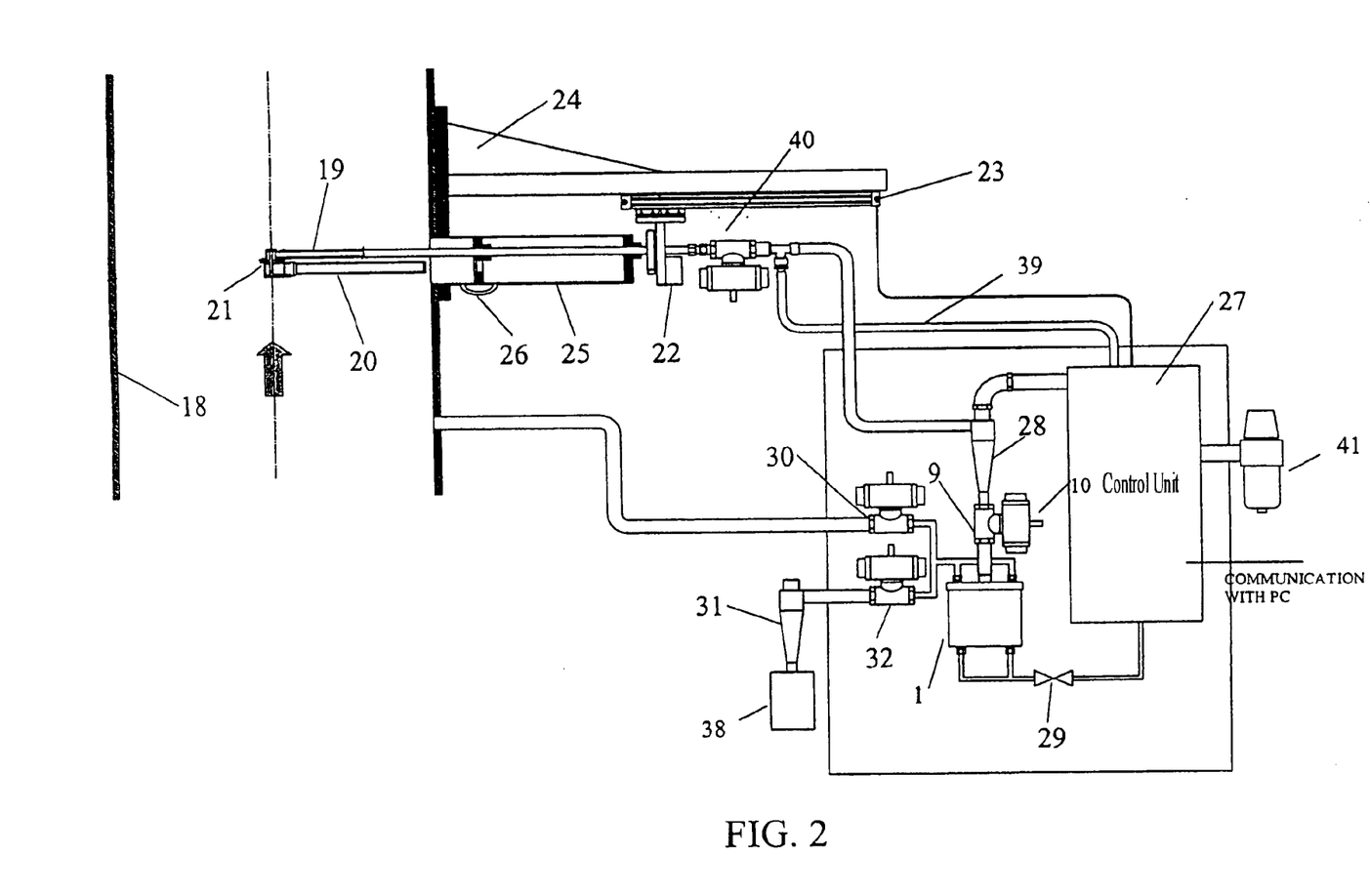
FIG. 2 shows the automatic capture, weighing and expulsion system integrated in an automatic solid particle sampling system based on the ISO 9931 standard. The joint system constitutes a continuous measurement system of the flow of solids in pneumatic carrier ducts. The figure shows a rotating probe (19) which may be inserted or retracted from the duct (18) by means of a pneumatic cylinder (23).

The injection of compressed air through the lower part of the system also avoids the deposit of particles in the circular corona between the container (2) and the container (5). This deposit of particles would create a certain contact between these parts, which would mean that the weight of the particles would not be applied in its entirety to the load cell (7), and would thus give a low weight reading. The expulsion system also avoids the accumulation of dust on the load cell (7) which could damage it A direct application of the system of capture, weighing and expulsion described above is its integration in automatic isokinetic sampling systems of pulverised coal in the transport ducts to the burners in power stations. FIG. 2 shows, as an example, an integrated system for determining the mass flow of coal in a duct.

Figure 3:
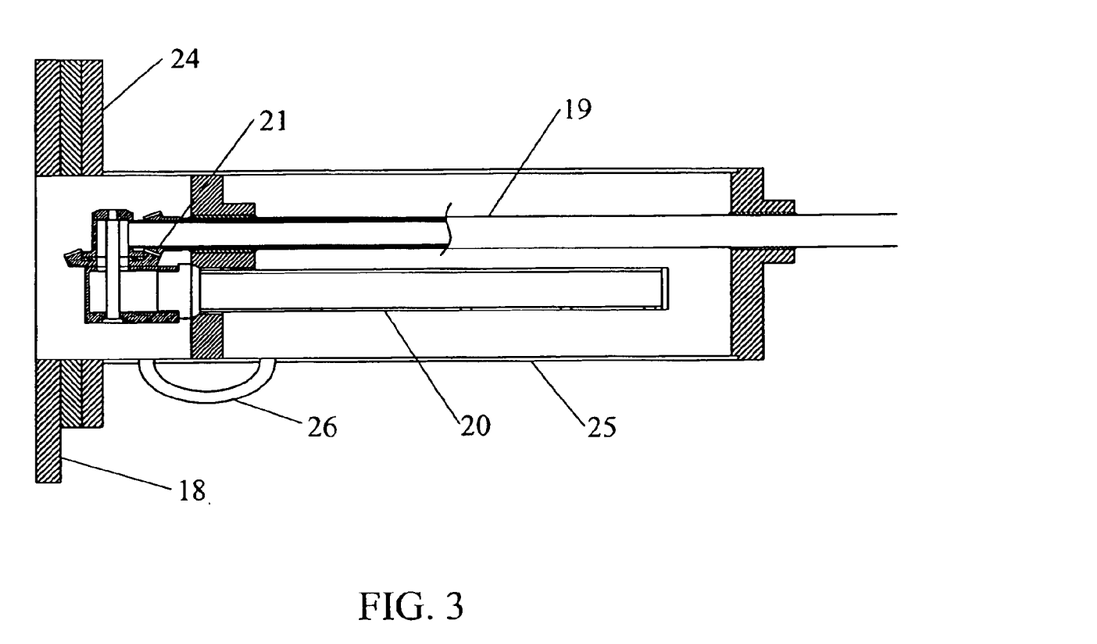

This system consists of a rotating probe (19) similar to that specified in the ISO 9931 standard, except that it uses a cylindrical tube (20) with four 5 mm holes for the extraction of the sample, which are opposite the stream of air and coal and are located as indicated in the standard with respect to the axis of the duct, depending on its diameter. This cylindrical tube (20) rotates around the axis of the duct (18), by means of a tube rotation mechanism (21) actuated by an electric motor (22).

The probe (19) can be inserted into and retracted from the duct (18) by means of a pneumatic cylinder (23) which is supported on a bracket (24) fastened onto the duct (18).

When the probe (19) is retracted, the cylindrical tube (20) remains in the cylindrical chamber (25). Before the beginning of a sampling sequence, air is provided via a pressurized air line (39) through the probe sample valve (40) to the probe in order to clear possible obstructions from the sample intake holes, and to clean the chamber (25) of possible coal deposits.

To make this cleaning flow possible, the chamber (25) has a by-pass line (26) which connects it to the inside of the duct (18) as shown in FIG. 3. There is no flow from the duct (18) to the chamber (25) through this by-pass (26), since both are at the same pressure, the latter being sealed from the surrounding air. Flow is initiated from the chamber (25) to the duct (18) when the probe sample valve is opened and pressurized air is admitted for cleaning from the control unit (27).

The probe (19) is connected to the control unit (27) where there is a pneumatic system and the necessary instrumentation, as indicated in the ISO 9931 standard, for the production of the suction required to extract the sample. The aspiration velocity of the sample is calculated from data on the operation of the mills, such as the transport air flow and the temperature and pressure of the air-coal mixture in the ducts. This data, which is monitored in the power station control room, is processed by a PC which calculates the necessary suction and sends a signal via a communications cable to the control unit (27). This control unit establishes and controls the calculated aspiration velocity, and the overall operation of the equipment. A relief valve (41) is provided for the pneumatic systems.

The sample from the probe (19) is transported via duct or pipe to a high efficiency cyclone (28) which separates the particles of coal from the sample extracted. The separated particles fall by gravity into the capture, weighing and expulsion system. Once the sample has been taken, the control unit (27) closes the pneumatic valve (9) and weighs the sample collected. The weight signal generated by the transmitter (11) is sent to the control unit (27) for processing. Once this signal is received, the sample is expelled by the injection of filtered compressed air from the control unit (27). The expulsion air flow can be regulated by the regulator (29).

The sample expelled may be returned to the transport duct (18) by opening the pneumatic valve (30) during the expulsion phase, or taken to a cyclone (31) to be collected at the lab sample station (38) for analysis in a laboratory, in which case the pneumatic valve (32) would be opened.

Figure 4:
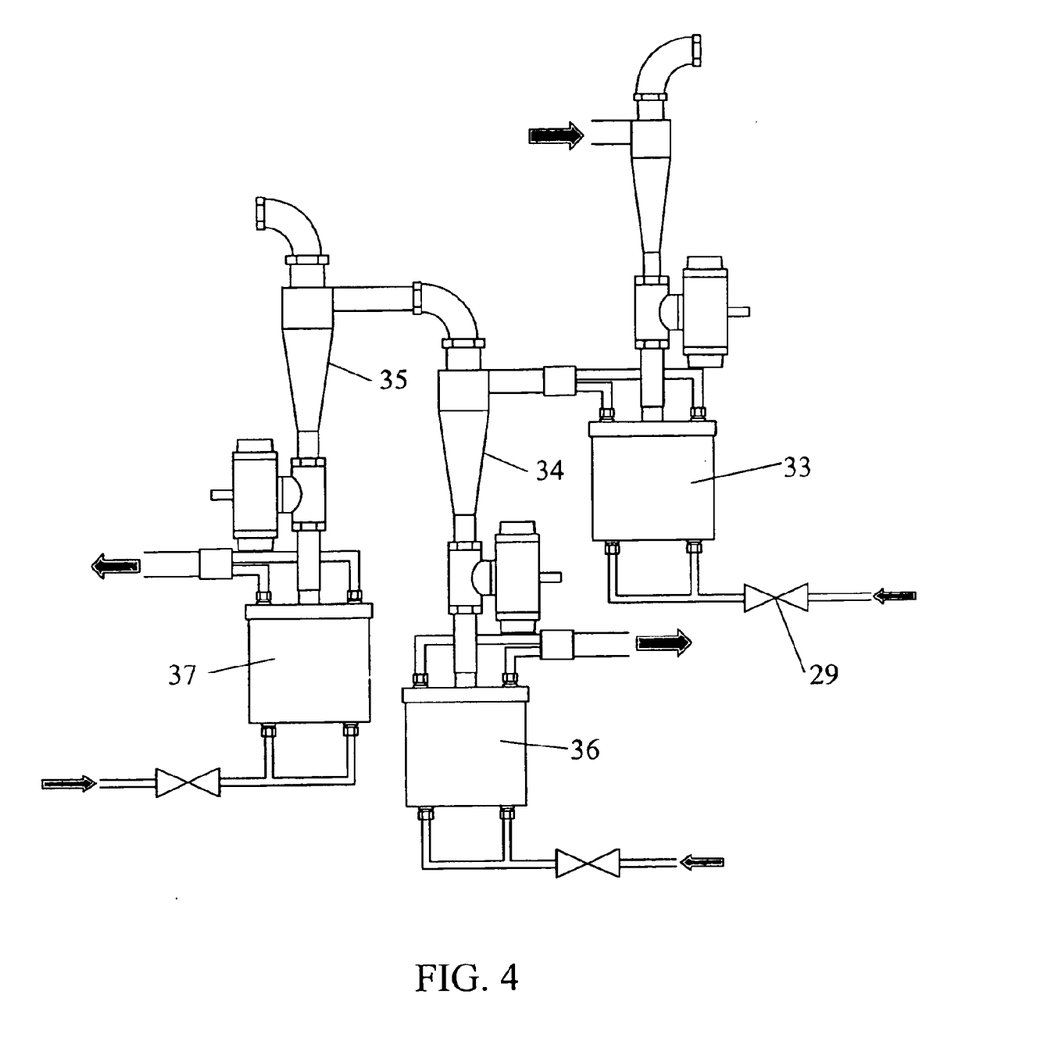
FIG. 4 shows the basic application of the automatic capture, weighing and expulsion system for the determination of the size distribution of the weighed sample. The expulsion system transports the sample, using a known transport stream, to two cyclones in series (34) and (35), each of which is connected to an additional weighing system (36) and (37). Depending on the design of the cyclones (34) and (35) and on the fraction of the sample separated in each of them, the size distribution of the original sample can be inferred.

An additional application of the automatic capture, weighing and expulsion system, it can be used to automatically determine the size distribution of the sample collected. FIG. 4 shows the basic layout for the determination of this size distribution. Once the sample has been collected and weighed in an initial capture, weighing and expulsion system (33), it is transported by an expulsion air stream, whose design flow is established by the flow regulator (29), to two cyclones (34) and (35) connected in series. These two cyclones are designed depending on the design air flow for expulsion, to produce two substantial fractions of the original samples. These two fractions are quantified in two capture, weighing and expulsion systems (36) and (37). Depending on the weights and the efficiency of each cyclone to capture the particles contained in certain predetermined ranges of sizes, the percentage of particles from the original sample with sizes in each of those ranges may be inferred.

We claim:

1. An apparatus and system for the automatic capture, weighing, and expulsion of solid particles in a process stream comprising:
    means for the automatic insertion and retraction of a probe into a process stream duct or pipe;
    means for the rotation of the probe after insertion;
    means for transporting via ducts or pipes, a sample of solid particles obtained from the probe inserted in the process stream to a weighing chamber;
    means for controlling flow in the ducts or pipes; and
    means for controlling automatic operation of the apparatus and system.

2. An apparatus and system according to claim 1 in which the weighing chamber comprises:
    means for allowing the entrance of the solid particles;
    means for determining the weight of the solid particles; and
    means for expulsion of the solid particles after their weight is determined.

3. An apparatus and system according to claim 2 including a means for transmitting a signal, which is relative to the weight of the solid particles, to a control unit.

4. An apparatus and system according to claim 3 including a means for transmitting signals to process control devices in a plant.

5. An apparatus and system according to claim 4 including a means to program the automatic operation of the apparatus and system, and interface with a flow regulation system.

6. An apparatus and system according to claim 2 in which the particles are coal and the plant is a coal plant.

7. An apparatus and system according to claim 2 integrated in an automatic sampling system based on international standards including at least one of the following: ASTM D197-87, ISO 9931 and the ESI Industry Standard for the determination of mass flow of particles in the duct or pipe.

8. An apparatus and system according to claim 2 which is used as the means to calibrate a measuring system which determines mass flow of particles through pneumatic transport ducts.

9. An apparatus and system for the automatic capture, weighing, and expulsion of solid particles in a carrier gas comprising:
    a probe inserted into a process duct or pipe;
    a weighing chamber which generates a signal proportional to weight of the particles;
    a sample duct or pipe to transport a sample and connect the probe, a separation device, the weighing chamber, and a return to the process duct;
    a device to separate the solid particles from the carrier gas;
    a control unit;
    valves to allow or stop flow in the ducts or pipes as required by the control unit;
    a cable connecting the weighing chamber to the control unit; and
    a compressed air source connected to the weighing chamber.

10. An apparatus according to claim 9 in which the sample is captured in a lab sample container instead of a return to the process duct.

11. An apparatus and system according to claim 9, in which the weighing chamber comprises:

an airtight outer container;

an inner container which is concentric to the outer container except for at its conical base;

a small space between the side walls of the inner container and the outer container side walls;

a sealed lid on top of the outer container side walls with a small space above the top of the inner container forming a pneumatic maze to prohibit particle transmission between the inside of the inner container and the inside of the outer container;

one or more entrance ducts or pipes penetrating the lid for discharging particles into the inner container;

the bottom of the inner container resting on a platform attached to a weighing sensor which is attached to the inside bottom of the outer container;

an upper and a lower physical stop to restrict movement of the platform to protect the weighing sensor from excess movement;

a sealed penetration for the cable which is electrically connected between the weighing sensor and a transmitter which is external to the weighing chamber;

one or more sealed entrance penetrations to deliver compressed air into the bottom of the outer container below the inner container to enable discharge of the particles; and two or more ducts or pipes penetrating the lid and extending down inside the inner container to a small distance above the beginning of the conical section for the discharge of the particles after weighing.

12. An apparatus and system according to claim 11 in which the control unit is electrically connected to a flow regulation system in a plant.

13. An apparatus and system according to claim 11 in which the control unit includes a programmable processor to control the apparatus and interface with a flow regulation system in a plant.

14. An apparatus and system according to claim 11 configured to determine a mass flow of particles in the process duct or pipe.

15. An apparatus and system according to claim 14 in which the particles are coal.

* * * * *